July 10, 1951     A. A. GRADISAR     2,560,169
MICROSCOPE ADJUSTMENT MECHANISM
Filed June 29, 1946
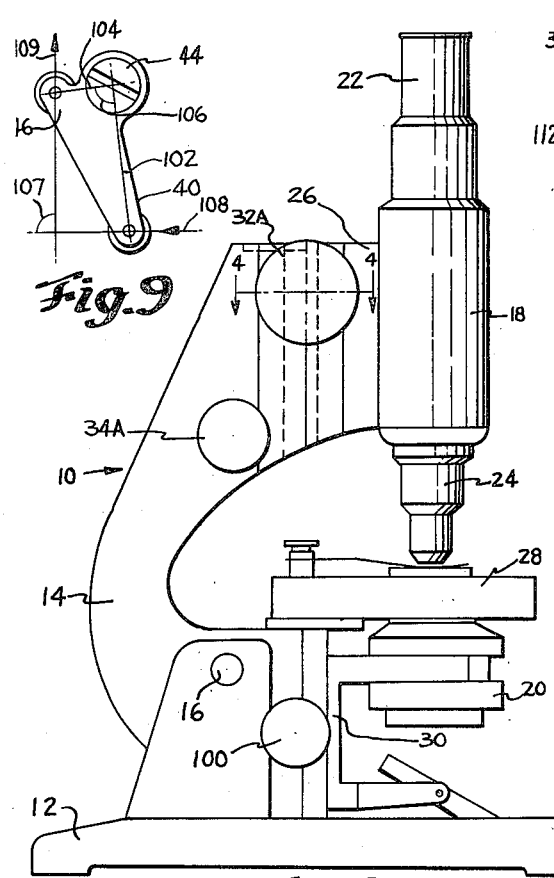
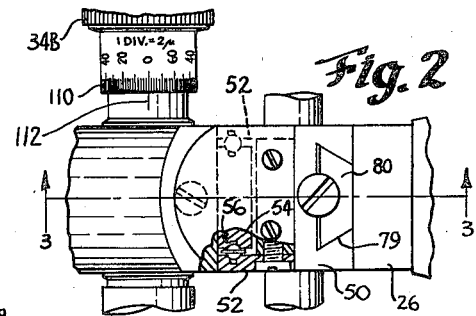
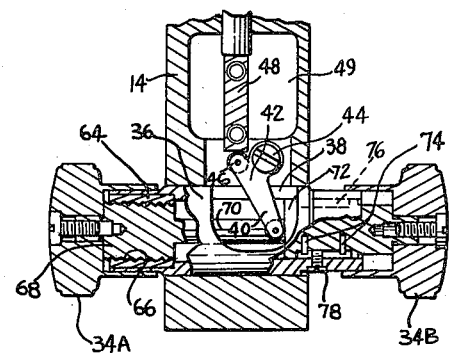
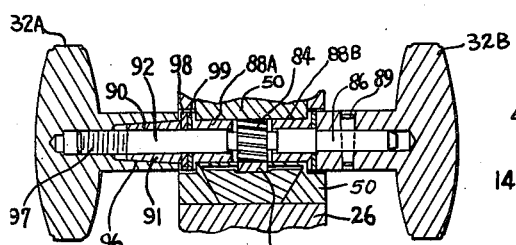
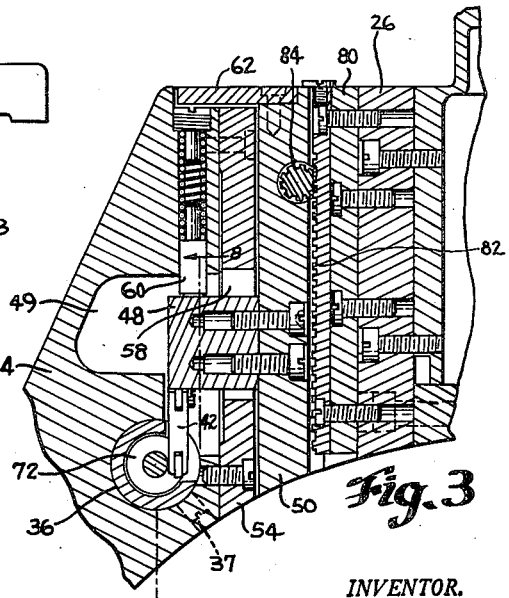
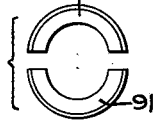
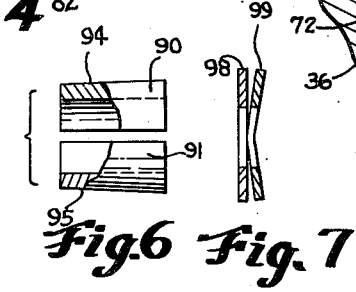
INVENTOR.
ALBIN A. GRADISAR
BY *Noble S. Williams*
ATTORNEY Patented July 10, 1951

2,560,169

UNITED STATES PATENT OFFICE 2,560,169

MICROSCOPE ADJUSTMENT MECHANISM

Albin A. Gradisar, Buffalo, N. Y., assignor to American Optical Company, Southbridge, Mass., a voluntary association of Massachusetts Application June 29, 1946, Serial No. 680,446

5 Claims. (Cl. 88—39)

This invention relates to adjustment mechanisms for microscopes and the like, and more particularly relates to fine and coarse adjustment mechanisms for focusing the body tubes of such microscopes relative to the stages thereof. The invention is equally useful for adjusting the condenser assemblies of such microscopes relative to their stages.

The high degree of refinement to which the present day research, polarizing, petrographic and similar microscopes have been developed has resulted in placing exceedingly heavy loads upon both the coarse and fine adjustment mechanisms for the body tubes of such microscopes. Similarly heavy loads have been placed upon the adjustment mechanisms for the condenser assemblies of such microscopes. For example, when a microscope body tube is provided with an inclined binocular head and a rotatable nosepiece carrying three or four objectives, the weight upon the adjustment mechanisms therefor at the upper end of the tiltable supporting arm of the microscope becomes excessive. Likewise a condenser assembly which uses, for example, a main condenser unit, a swingable auxiliary condenser unit, an Ahrens polarizer, a pair of adjustable iris diaphragms and a mirror places a heavy load upon the adjustment mechanism employed for mounting such structure upon the lower end of the tiltable supporting arm of the microscope. It is not only necessary that such adjustment mechanisms move the body tube and condenser assembly smoothly and evenly throughout their entire range of travel but equally necessary that they be definite and positive in their holding action for maintaining the parts in any adjusted position during use of the instrument. Furthermore, during use of such a microscope, it is often desirable to be able to adjust the body tube accurately through known minute distances, without requiring calculations or consideration of the particular position of the body tube on the supporting arm.

It is, accordingly, an object of the present invention to provide new and improved adjustment mechanisms for microscopes. It is a further object of the invention to provide new and improved mechanisms for producing adjustment between relatively movable parts of a microscope with the operating parts of said mechanism completely enclosed so as to be concealed and protected from dust and the like. It is an additional object of the invention to provide adjustment mechanisms of the character described which are of economical and sturdy construction, are formed of few parts, are constructed and calibrated to give positive operation and accurate indication of distances traversed by body tube and have a minimum number of movable parts where any appreciable wear may occur. It is a further object to provide a mechanism of the character described which may be adjusted and readjusted, without requiring the use of tools or the like, to provide the proper amount of tension or resistance desired in the mechanism for securely maintaining the body tube, condenser assembly or the like in various adjusted positions during the use of the microscope.

Various other objects and advantages will become apparent from the following description of a preferred form of the invention taken in conjunction with the accompanying drawing, in which:

Fig. 1 is a side elevational view of a microscope embodying the present invention;

Fig. 2 is an enlarged plan view of certain adjustable parts of the microscope of Fig. 1 and showing portions thereof in section;

Fig. 3 is a sectional view taken substantially on line 3—3 of Fig. 2 and looking in the direction of the arrows;

Fig. 4 is an enlarged sectional view taken substantially on lines 4—4 of Fig. 1 and looking in the direction of the arrows;

Figs. 5 and 6 are enlarged end and side views, respectively, of parts employed in the mechanism of Fig. 4, the parts in Fig. 6 being partly broken away to more clearly shown details thereof;

Fig. 7 is an enlarged sectional view of one form of spring washers which may be used in the mechanism of Fig. 4;

Fig. 8 is a sectional view taken substantially on lines 8—8 of Fig. 3 and looking in the direction of the arrows; and Fig. 9 is a side view of the lever mechanism of Fig. 8, enlarged somewhat to show certain details thereof.

Referring to the drawing in detail, it will be seen that the microscope indicated generally by the numeral 10 has a supporting base 12 upon which a curved supporting arm 14 is tiltably mounted for pivotal movement about an inclination joint 16 so that a microscope body tube 18 carried upon the upper end of this arm and a condenser assembly 20 carried upon the lower end thereof may be simultaneously tilted for conveniently positioning an eyepiece 22 for use by an operator. On the lower end of body tube 18 is carried an objective 24. While the present disclosure of Fig. 1 shows a monocular microscope secured to a supporting or mounting block 26 on arm 14 and employs only a single objective, it will be obvious to those skilled in the art that other types of body tubes carrying heavier structures of known construction may as readily be secured upon the mounting block 26 for adjustment purposes. Adjustment of block 26 and the structure carried thereby will move and focus the objective 24 relative to a stage 28 and objects or specimens supported thereon. Adjustment of a carriage 30 supported on the lower end of arm 14 will change the position of the condenser assembly 20 relatively to the stage 28.

In order to provide coarse and fine adjustments for the body tube 18 there are provided a pair of knobs 32A and 32B and a second pair of knobs 34A and 34B, respectively. The knobs 34A and 34B are located appreciably lower on the supporting arm 14 than the knobs 32A and 32B for the convenience of the operator. Referring to Figs. 3 and 8 it will be seen that the fine adjustment mechanism comprises a tubular member 36 secured in a transverse opening in the arm 14 by screws 37 and this member 36 has an opening 38 formed therein for receiving the lower long arm 40 of a lever 42 which is pivoted on member 44 threaded into the supporting arm 14 and member 44 is so positioned that a short arm 46 of said lever engages a block 48 so that as the lower end of the lever is moved laterally the short arm thereof will vertically adjust the block 48. A recess 49 is provided in arm 14 for accommodating portions of block 48 and lever 42. Small anti-friction rollers are carried by the long and short arms of lever 42 for reducing friction in the parts so that the slight arcuate movement of said short arm about pivot 44 will not produce any lateral pressure on block 48.

Block 48 is rigidly secured to an intermediate supporting member 50 which has secured at its opposite sides bearing blocks 52. A bearing block 54 is suitably fixedly secured to the arm 14 and V-shaped vertically extending bearing guides are formed in the opposed surfaces of these blocks 52 and 54 so that a plurality of ball bearings separated by spacer members may be positioned, as indicated at 56, between these opposed guideways and serve to allow limited vertical movement of intermediate member 50 relative to the arm 14 and bearing block 54. The bearing block 54 is provided with a central opening 58 through which block 48 extends and this opening is of sufficient length to adequately allow the desired vertical movement of members 48 and 50 throughout the fine adjustment range of the instrument. A spring pressed plunger assembly 60 is arranged in arm 14 to bear downwardly upon the upper surface of block 48 and firmly maintain this block in engagement with the roller carried by the short arm of lever 42. A removable cover 62 is secured in a recess formed in the upper end of intermediate supporting member 50 and arranged to overlie the bearing guideways and said plunger assembly and protect same from dust, foreign particles and the like.

The tubular member 36 has end portions which extend appreciably laterally beyond the sides of arm 14 and one of these extensions is internally annularly recessed to receive a ring 64 of only slightly less internal diameter than tubular member 36 and the inner surface thereof is provided with fine threads adapted to be engaged by an enlarged threaded end portion 66 of a fine adjustment member 68. A narrower intermediate portion 70 of the member 68 is provided to accommodate the long arm of lever 42 and an integral bearing collar 72 is provided on member 68 adjacent portion 70 for engagement with the roller on the end of arm 40 so that as member 68 is rotated the threaded end portion 66 will cause lateral micrometer adjustment of the member 68 and collar 72 and, accordingly, pivotal movement of lever 42 for the fine adjustment of the members 48 and 50 and thus microscope body tube 18. Handles 34A and 34B are secured upon the opposite ends of member 68 for rotating this member and small pins 74 are positioned in laterally spaced relation in a recess 76 in the opposite end portion of member 68 for limiting the lateral adjustment thereof. A screw 78 is threaded into the tubular member 36 and its engagement with one or the other of these pins 74 serves as a positive stop to limit the lateral movement of the member 68 as it is rotated in either direction. Skirt portions on handle 34A and 34B overlie the extensions of the tubular member 36 and serve to exclude dust and the like from the interior of the fine adjustment mechanism. Thus it will be seen that adjustment of member 68 toward the left as viewed in Fig. 8 will cause a positive upward movement of block 48 and thus body tube 18. Conversely, spring plunger assembly 60 will cause downward movement of block 48 when the member 68 is shifted toward the right. However, since no positive connection is provided between block 48 and lever 42 no positive pull will be placed upon block 48 and should the microscope objective come into contact with the specimen or slide on the stage 28 no excessive or injurious stress will be transmitted to these delicate parts of the fine adjustment mechanism.

The intermediate supporting member 50 is provided with V-shaped guideways as indicated at 79 arranged to engage the wedge shaped member 80 secured to mounting block 26 and to the vertical central portion of member 80 is secured a rack bar 82 for engagement by a pinion 84 fixedly secured to an intermediate portion of a shaft 86. As best seen in Fig. 4 this shaft is mounted for rotation in flanged bearings 88A and 88B fitting into suitably shaped recesses formed in the intermediate member 50. The handle 32B is pinned as indicated at 89 to shaft 86 so that rotation of this handle in either direction will rotate pinion 84 and cause vertical movement of the rack 82, block 26 and body tube 18. Since an exceedingly heavy weight is supported by this rack and pinion arrangement, there is a strong tendency that the pinion 84 will be rotated thereby and the microscope body tube will be allowed at times to creep or slide downwardly out of its proper position of adjustment. In order to provide convenient and readily adjustable means to prevent such undesired shifting of the microscope body tube there is provided a pair of frustro-conical and slightly less than semi-circular members 90 and 91 which are arranged to fit closely about the cylindrical surface 92 of the shaft 86 toward the opposite end thereof from the pin connection 89. The outer surfaces 94 and 95 of these wedge members 90 and 91 are slightly tapered as will best be seen by Fig. 6 and over these tapered surfaces is arranged to fit the internal tapered surface 96 of the member 32A. The free end 97 of shaft 86 is threaded to receive the internal threads of knob 32A so that as this handle is rotated to thread same onto the end 97 of shaft 86, while handle 32B is held stationary, the internal tapered surface 96 will slide over and engage the tapered surfaces 94 and 95 of the members 90 and 91 and tend to force these members inwardly and toward the right as viewed in Fig. 4.

A pair of spring washers 98 and 99 are positioned on shaft 86 inwardly of the wedge members 90 and 91. The washer 99 is slightly bent along a diameter thereof, as is clearly indicated in Fig. 7, so that when these washers are in operative position in engagement with flanged bearing 88A and the inner end portions of the members 90 and 91, they act as friction means for opposing rotation of shaft 86. During the assembly of these parts, knob or handle 32A is rotated so as to move axially toward the right as far as possible while handle 32B is held stationary and this causes wedge members 90 and 91 to engage washers 98 and 99 which are compressed and which in turn drive wedge members 90 and 91 forcefully into the recess in knob 32A and into tight engagement with surfaces 92 and 96. Knob 32A is then rotated outwardly or toward the left slightly, while knob 32B is still held stationary, to adjust the parts to produce the amount of drag or frictional resistance desired and which will be sufficient to prevent undesired rotation of the pinion 84 due to the load supported by rack 82.

Thus the microscope body tube and structure carried thereby may be readily adjusted on arm 14 and retained by this adjustment mechanism in any adjusted position. Since the taper of surfaces 94, 95 and 96 is very slight, the inward or radial pressure upon the wedge members caused by the surface 96 of knob or handle 32A will be exceedingly high and, accordingly, will cause a firm gripping of the surface 92 by members 90 and 91. This gripping action will be such that when proper adjustment of knobs 32A and 32B has been accomplished either of these knobs may be gripped separately for producing an adjustment of the body tube on the arm 14. When desired, slight relative movement between handles or knobs 32A and 32B may be employed to provide any degree of drag or frictional resistance desired in the adjustment mechanism.

While the movable parts of this adjustment mechanism are shown in Fig. 4 as carried by the intermediate member 50 and the rack bar 82 is carried by block 26, it will be readily apparent that these parts could be reversed, if desired, so that the bar 82 would be supported by the intermediate member 50 and the operating parts supported by the block 26. In such case, however, the control knobs 32A and 32B would move up and down during adjustment of the mechanism.

The condenser assembly 30, previously referred to, may be provided with an adjustment means 100 and it will be obvious that this adjustment means may be constructed in a manner similar to the structure disclosed by Figs. 4, 5, 6 and 7.

Referring again to Figs. 2 and 8, as well as Fig. 9, it will be seen that lever 42 is so constructed and arranged that a straight line 102 extending through the center of the roller on long arm 40 and the pivotal center of member 44 and a second straight line 104 extending through the center of the roller on short arm 46 and the pivotal center of member 44 form an angle 106 therebetween which is equal in size to the angle of deviation 107 formed between the direction of the applied force 108 to lever arm 40 and the direction of the resultant force 109 produced by short arm 46. Such an arrangement provides a constant lever arm ratio for the lever 42 so that for each degree of rotation of the handles 34A and 34B, and thus for the collar 72, throughout the entire range of operation of collar 72 the block 48 will travel equal lineal amounts or units which are proportional to the effective lever arm ratio. Thus when fine adjustment knob 34A or 34B is provided with calibrations, such as indicated at 110 next to a zero reference mark 112, and spaced to provide a definite value therebetween, such as two microns per division, the lineal movement of the body tube 18 in either direction will be, for each division of rotation, equal to two microns regardless of the angular position of the lever 42 or the lateral deviation of adjustment member 68. It is, of course, essential that the surfaces engaged by the rollers on the long and short arms of the lever 42 be flat and disposed at right angles to the direction of force being transmitted by the respective rollers. In the present disclosure the angles 106 and 107 are each shown as right angles. It should be noted, however, that angles other than right angles may as readily be used to produce a constant lever arm ratio mechanism so long as the angle included between the lever arms is equal to the angle included between the applied and resultant forces. While the preferred construction shows the use of rollers on the long and short arms of lever 42, it should be noted that fixed arcuate bearing surfaces or pivoted arcuate bearing surfaces may be employed thereon, if desired, for engagement with members 48 and 72. However, in such construction with fixed surfaces more friction results. The use of rollers works best and accordingly is desirable as the preferred construction. However, arcuate bearing surfaces will provide the constant lever arm ratio desired by applicant and in such an arrangement lines 102 and 104 would extend through the geometric centers of the arcuate bearing surfaces and the pivotal center of lever 42.

Attention is called to a divisional application Serial No. 149,568 which was filed March 14, 1950, to cover subject matter disclosed but not claimed herein.

Having described a preferred form of the invention in detail, I claim:

1. The combination of a main supporting member, an auxiliary supporting member, guide means interconnecting said members, and an adjustable mechanism associated with said members for selectively changing the relative position therebetween, said adjustment mechanism comprising bearing surfaces carried by one of said members, rotatable means carried thereby, means connected to the other of said members and operatively engaged by said rotatable means for actuation thereby, a pair of control knobs carried by said rotatable means at opposite sides of said supporting members, one of said knobs being normally fixedly secured to said rotatable means and the other of said knobs being threaded thereon and having a tapered internal surface, resilient means between one of said knobs and said supporting members for producing a frictional resistance to the rotation of the rotatable means, and pressure means comprising a plurality of wedge elements engaging a cylindrical surface on said rotatable means and said tapered internal surface, and adjustable inwardly along said cylindrical surface by movement of said other knob relative to said rotatable means for forcing said elements into firm wedging engagement and for producing a pressure on said resilient means and thus regulating the frictional resistance produced by said resilient means.

2. The combination of a main supporting member, an auxiliary supporting member, guide means interconnecting said members, and an adjustable mechanism associated with said members for selectively changing the relative position therebetween, said adjustment mechanism comprising bearing surfaces carried by one of said members, rotatable means carried thereby, means connected to the other of said members and operatively engaged by said rotatable means for actuation thereby, a pair of control knobs carried by said rotatable means at opposite sides of said supporting members, one of said knobs being normally fixedly secured to said rotatable means and the other of said knobs being threaded thereon and having a tapered internal surface, resilient means between the supporting member carrying said rotatable means and one of said knobs for producing a frictional resistance to the rotation of the rotatable means, and wedge means engaging a cylindrical surface on said rotatable means and said tapered internal surface, and adjustable along said cylindrical surface by inward movement of said other knob relative to said rotatable means for producing a pressure on said resilient means and regulating the amount of frictional resistance produced by said resilient means, said wedge means being positioned about said cylindrical surface so as to be firmly wedged between said tapered internal surface and said cylindrical surface when forced into assembled position by said inward movement, and normally prevent relative rotation between said other knob and said rotatable means when so assembled.

3. In a microscope of the character described, the combination of a first supporting member, a second supporting member, guide means interconnecting said supporting members, and an adjustment mechanism for changing the relative relationship between said supporting members, said mechanism comprising a pair of flanged bearings extending into a transverse bore in one of said members, a rotatable shaft carried by said bearings and having a pinion gear thereon positioned between said bearings, a rack bar carried by the other of said supporting members and operatively engaged by said pinion gear for actuation thereby, a pair of control knobs on said shaft at opposite sides of said members, one of said knobs being normally fixedly secured to said shaft, the other of said knobs being threaded thereon and having a tapered internal surface, resilient means positioned on said shaft and arranged to provide frictional resistance for opposing the rotation of said shaft and pinion gear, and shaft gripping means comprising a plurality of spaced wedge-like members positioned between a cylindrical portion of said shaft and said tapered surface, and adjustable along said cylindrical portion toward said bearings by relative movement between said threaded knob and said shaft in a manner to cause said wedge-like members to firmly grip said shaft and then rotatable in the opposite direction to such a position as to press said resilient means into engagement with the flanged end of one of said bearings for producing the amount of frictional resistance desired in said adjustment mechanism.

4. The combination of a first supporting member, a second supporting member, guide means interconnecting said members, and an adjustment mechanism associated with said members for selectively changing the relative positional relation therebetween, said adjustment mechanism comprising bearing surfaces carried by one of said members, rotatable means including a rotatable shaft supported by said bearing surfaces, means connected to the other of said members and operatively engaged by said rotatable means for actuation thereby, a pair of control knobs carried by said rotatable shaft for actuating same and causing relative movement between said supporting members, said knobs being disposed at opposite sides of the supporting member carrying said bearing surfaces, with one of said knobs normally fixedly secured to said shaft and the other screw-threaded thereon, laterally shiftable wedge means positioned between said shaft and an overlying portion of the last mentioned knob and shiftable relative to the latter into firm frictional engagement with said shaft and said overlying portion so as to normally prevent rotational movement therebetween, and resilient means operatively positioned between said rotatable means and the supporting member therefor, said resilient means providing frictional resistance to the rotation of said rotatable means, said frictional resistance being variable by rotation and axial movement of one control knob relative to the other.

5. The combination of a main supporting member, an auxiliary supporting member, guide means interconnecting said members so as to allow relative movement therebetween, and an adjustment mechanism associated with said members for selectively changing the relative relation of one member with respect to the other, said adjustment mechanism comprising rotatable means carried by one of said members, means carried by the other of said members and operatively engaged by said rotatable means for actuation thereby, a control knob normally fixedly secured to said rotatable means for actuating same, a second control knob screw-threaded on said rotatable means and axially adjustable thereon by relative rotational movement therebetween, said knobs being disposed at opposite sides of the member supporting said rotatable means, a recess in said second knob, gripping means within said recess and primarily concealed thereby, said gripping means engaging said second knob and said rotatable means at substantially radially aligned locations within said recess so as to provide a wedging action therebetween when said gripping means is pressed into said recess, said gripping means thereafter normally effecting rotation of said rotatable means when said second knob is rotated, resilient means operatively positioned between one of said knobs and the supporting member supporting said rotatable means, said resilient means being stressed by forceful twisting movement of one control knob relative to and toward the other control knob, thereby producing a readily variable frictional resistance opposing rotation of said rotatable means.

ALBIN A. GRADISAR.

REFERENCES CITED

The following references are of record in the file of this patent:

UNITED STATES PATENTS

| Number | Name | Date |
|---|---|---|
| 1,223,198 | Ott | Apr. 17, 1917 |
| 1,274,561 | Kroedel | Aug. 6, 1918 |
| 1,910,121 | Muntz | May 23, 1933 |
| 1,968,094 | Ott | July 31, 1934 |
| 2,026,722 | Wollensak | Jan. 7, 1936 |
| 2,093,611 | Kurtz | Sept. 21, 1937 |
| 2,412,551 | Pratt et al. | Dec. 10, 1946 |